(12) United States Patent
Sakurada et al.

(10) Patent No.: US 12,137,193 B2
(45) Date of Patent: Nov. 5, 2024

(54) PRINTING SYSTEM FOR PERFORMING VISIBLE AND INVISIBLE PRINTING, TERMINAL APPARATUS FOR THE PRINTING SYSTEM, AND NON-TRANSITORY COMPUTER-EXECUTABLE MEDIUM FOR THE PRINTING SYSTEM

(71) Applicants: Kohhei Sakurada, Kanagawa (JP); Keiji Kunimi, Kanagawa (JP); Kohtaroh Harada, Kanagawa (JP)

(72) Inventors: Kohhei Sakurada, Kanagawa (JP); Keiji Kunimi, Kanagawa (JP); Kohtaroh Harada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/050,163

(22) Filed: Oct. 27, 2022

(65) Prior Publication Data
US 2023/0148080 A1    May 11, 2023

(30) Foreign Application Priority Data
Nov. 5, 2021  (JP) .................................. 2021-180952

(51) Int. Cl.
| H04N 1/32 | (2006.01) |
| H04N 1/00 | (2006.01) |
| H04N 1/54 | (2006.01) |

(52) U.S. Cl.
CPC ..... *H04N 1/32128* (2013.01); *H04N 1/00474* (2013.01); *H04N 1/54* (2013.01); *H04N 2201/327* (2013.01)

(58) Field of Classification Search
CPC .. H04N 1/32128; H04N 1/00474; H04N 1/54; H04N 2201/327
See application file for complete search history.

(56) References Cited

U.S. PATENT DOCUMENTS

2009/0080027 A1*  3/2009  Ugajin ............... H04N 1/32144
                                                          358/3.28
2010/0201995 A1*  8/2010  Yoshida ............. H04N 1/3875
                                                          358/1.13

(Continued)

FOREIGN PATENT DOCUMENTS

| JP | 2007-026353 | 2/2007 |
| JP | 2019-117352 | 7/2019 |
| JP | 2022-011936 | 1/2022 |

*Primary Examiner* — Nicholas Pachol
(74) *Attorney, Agent, or Firm* — Harness, Dickey & Pierce, P.L.C.

(57) ABSTRACT

A printing system includes an image forming apparatus capable of performing visible printing and invisible printing and a terminal apparatus. The terminal apparatus includes first circuitry. The first circuitry adds a printing command instructing to invisibly print an image of a two-dimensional code obtained by two-dimensionally encoding a print target image to print data generated based on the print target image. The first circuitry transmits, to the image forming apparatus, the print data to which the printing command is added. The image forming apparatus including second circuitry. The second circuitry visibly prints the print target image based on the print data transmitted from the terminal apparatus, and invisibly prints the image of the two-dimensional code according to the printing command added.

20 Claims, 14 Drawing Sheets

(56) References Cited

U.S. PATENT DOCUMENTS

| | | | |
|---|---|---|---|
| 2011/0026081 A1* | 2/2011 | Hamada | G06T 11/00 |
| | | | 358/1.18 |
| 2018/0255198 A1* | 9/2018 | Takano | H04N 1/00018 |
| 2019/0196382 A1 | 6/2019 | Tanaka et al. | |
| 2019/0286036 A1 | 9/2019 | Minegishi | |
| 2020/0081669 A1 | 3/2020 | Kunimi et al. | |
| 2020/0167454 A1* | 5/2020 | Tanaka | H04N 1/00838 |
| 2020/0278618 A1 | 9/2020 | Kanatani et al. | |
| 2020/0336622 A1* | 10/2020 | Kunimi | H04N 1/00482 |
| 2020/0412908 A1* | 12/2020 | Kobayashi | H04N 1/32101 |
| 2022/0011988 A1* | 1/2022 | Miyata | G03G 15/5016 |
| 2022/0201153 A1* | 6/2022 | Kobayashi | G06K 15/181 |

* cited by examiner

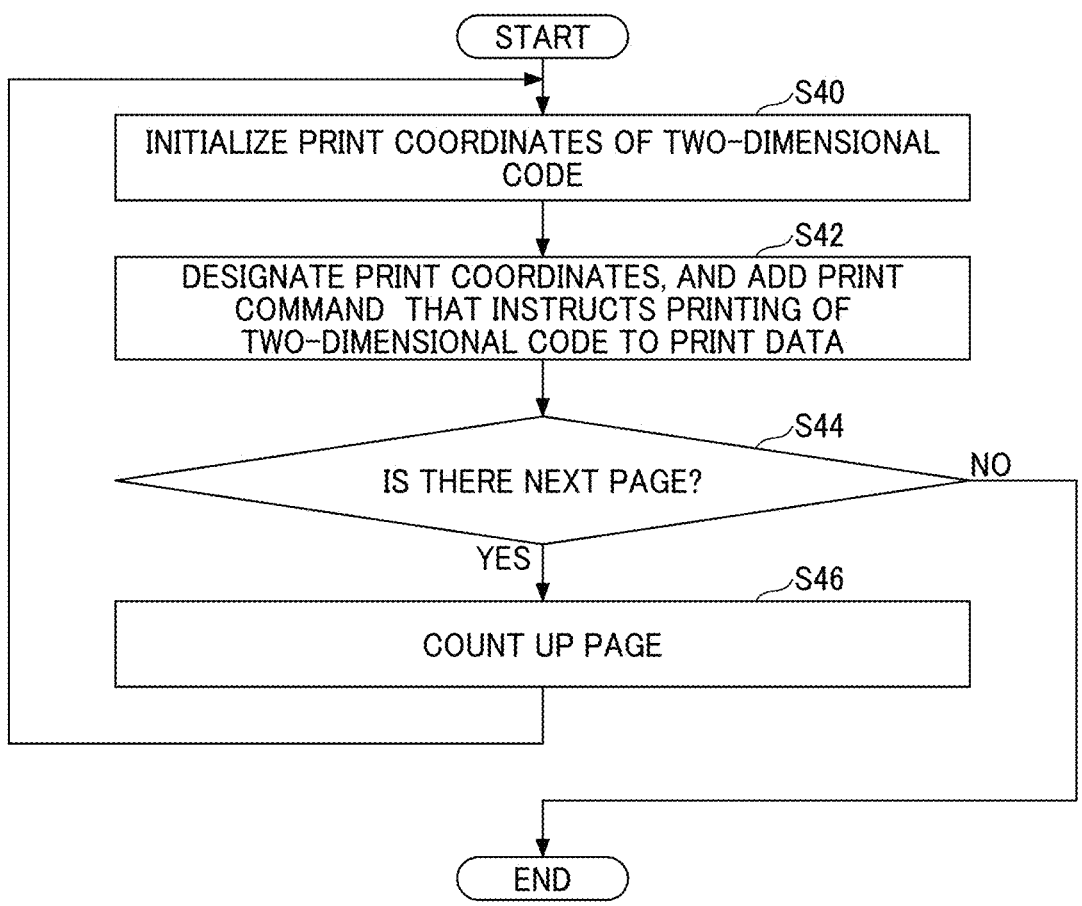

Invoice date: October 31, 2019
Invoice No.1910002S-1

Invoice

To XX Corporation
Your payment is listed below.
We kindly request the payment.

YY Corporation
ZZ, Tokyo
03-XXXX-XXXX

Amount including tax: ¥13,464

Details below

| No. | Product name | Quantity | Amount | Tax rate | Tax amount | Tax included |
|---|---|---|---|---|---|---|
| 1 | Notebook A4 | 10 | 1,200 | 10 | 120 | 1,320 |
| 2 | Notebook B5 | 10 | 800 | 10 | 80 | 880 |
| 3 | Notebook A5 | 10 | 1,000 | 10 | 100 | 1,100 |
| 4 | Notebook B4 | 10 | 1,500 | 10 | 150 | 1,650 |
| 5 | Pen Black | 25 | 2,500 | 10 | 250 | 2,750 |
| 6 | Pen Red | 25 | 2,500 | 10 | 250 | 2,750 |
| 7 | Pen Blue | 25 | 2,500 | 10 | 250 | 2,750 |
| 8 | Tape | 3 | 240 | 10 | 24 | 264 |

Invoice date: October 31, 2019
Invoice No.1910002S-1

Invoice

To XX Corporation
Your payment is listed below.
We kindly request the payment.

YY Corporation
ZZ, Tokyo
03-XXXX-XXXX

Amount including tax: ¥13,464

Details below

| No. | Product name | Quantity | Amount | Tax rate | Tax amount | Tax included |
|---|---|---|---|---|---|---|
| 1 | Notebook A4 | 10 | 1,200 | 10 | 120 | 1,320 |
| 2 | Notebook B5 | 10 | 800 | 10 | 80 | 880 |
| 3 | Notebook A5 | 10 | 1,000 | 10 | 100 | 1,100 |
| 4 | Notebook B4 | 10 | 1,500 | 10 | 150 | 1,650 |
| 5 | Pen Black | 25 | 2,500 | 10 | 250 | 2,750 |
| 6 | Pen Red | 25 | 2,500 | 10 | 250 | 2,750 |
| 7 | Pen Blue | 25 | 2,500 | 10 | 250 | 2,750 |
| 8 | Tape | 3 | 240 | 10 | 24 | 264 |

1110
1112

PRINTING SYSTEM FOR PERFORMING VISIBLE AND INVISIBLE PRINTING, TERMINAL APPARATUS FOR THE PRINTING SYSTEM, AND NON-TRANSITORY COMPUTER-EXECUTABLE MEDIUM FOR THE PRINTING SYSTEM

CROSS-REFERENCE TO RELATED APPLICATION

This patent application is based on and claims priority pursuant to 35 U.S.C. § 119(a) to Japanese Patent Application No. 2021-180952, filed on Nov. 5, 2021, in the Japan Patent Office, the entire disclosure of which is hereby incorporated by reference herein.

BACKGROUND

Technical Field

Embodiments of the present disclosure relate to a printing system, a terminal apparatus, and a non-transitory computer-executable medium.

Related Art

A technology is known in the art that converts a particular character string (text) included in print data into a two-dimensional code and prints the converted two-dimensional code together with the print data.

SUMMARY

An embodiment of the present disclosure includes a printing system including an image forming apparatus capable of performing visible printing and invisible printing and a terminal apparatus. The terminal apparatus includes first circuitry. The first circuitry adds a printing command instructing to invisibly print an image of a two-dimensional code obtained by two-dimensionally encoding a print target image to print data generated based on the print target image. The first circuitry transmits, to the image forming apparatus, the print data to which the printing command is added. The image forming apparatus including second circuitry. The second circuitry visibly prints the print target image based on the print data transmitted from the terminal apparatus, and invisibly prints the image of the two-dimensional code according to the printing command added.

An embodiment of the present disclosure includes a terminal apparatus including circuitry. The circuitry adds a printing command instructing to invisibly print an image of a two-dimensional code obtained by two-dimensionally encoding a print target image to print data generated based on the print target image. The circuitry transmits, to an image forming apparatus that is capable of performing visible printing and invisible printing, the print data to which the printing command is added.

An embodiment of the present disclosure includes a non-transitory computer-executable medium storing a program storing instructions which, when executed by one or more processors of a terminal apparatus, causes the terminal apparatus to perform a method. The method includes adding a printing command instructing to invisibly print an image of a two-dimensional code obtained by two-dimensionally encoding a print target image to print data generated based on the print target image. The method includes transmitting, to an image forming apparatus that is capable of performing visible printing and invisible printing, the print data to which the printing command is added.

BRIEF DESCRIPTION I/F THE DRAWINGS

A more complete appreciation of embodiments of the present disclosure and many of the attendant advantages and features thereof can be readily obtained and understood from the following detailed description with reference to the accompanying drawings, wherein:

FIG. 11 is a flowchart of an example of an operation of adding, to print data, a printing command instructing to print a two-dimensional code image with infrared (IR) toner, according to an embodiment of the present disclosure;

Figures 12A, 12B:
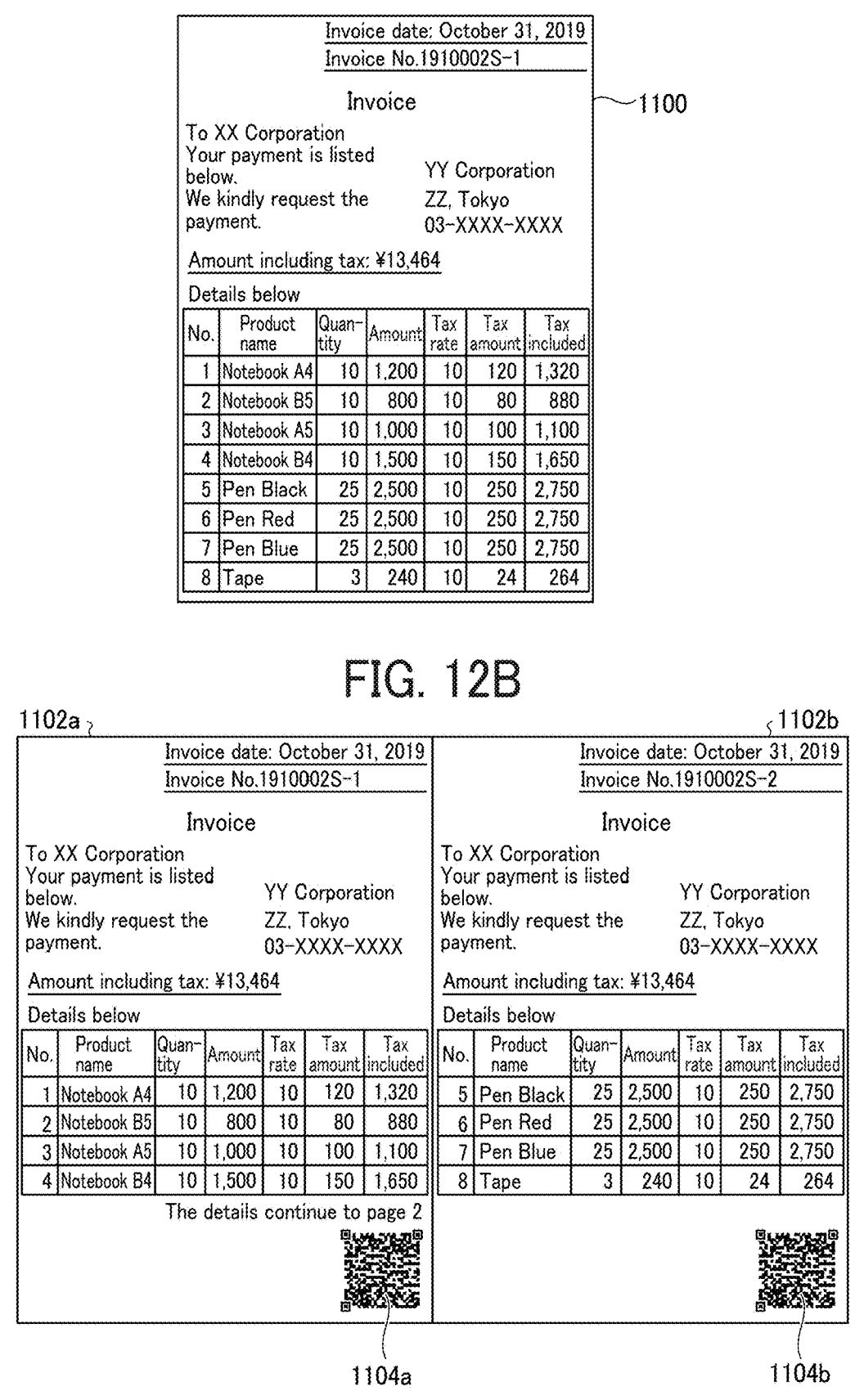
Figure 12C:
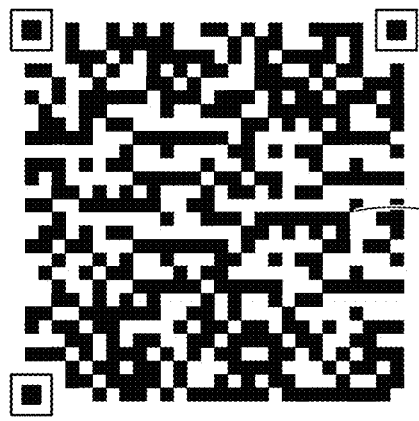

FIG. 12A, FIG. 12B, and FIG. 12C are illustrations for describing examples of a print result in which a two-dimensional code is printed as visible, according to an embodiment of the present disclosure; and FIG. 13A and FIG. 13B are illustrations for describing examples of a print result in which a two-dimensional code is printed as invisible, according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, embodiments of the present disclosure are described with reference to the drawings.

First Embodiment

System Configuration

Figure 1:
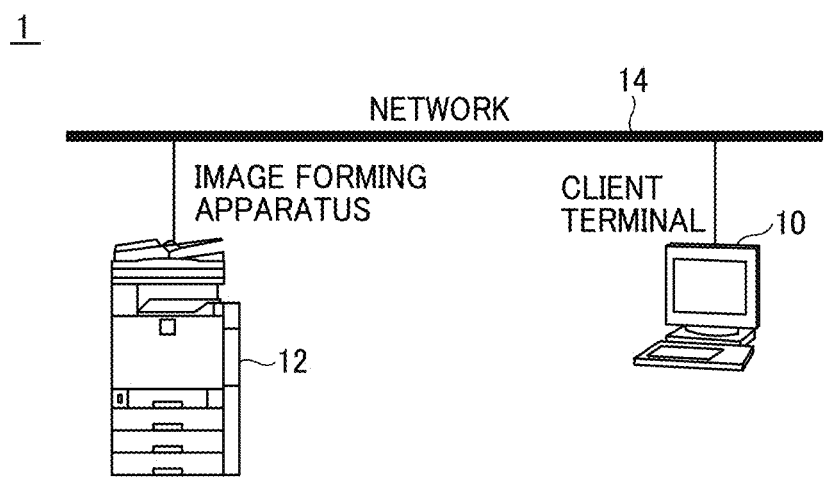
FIG. 1 is a schematic diagram illustrating an example of a configuration of a printing system, according to an embodiment of the present disclosure.

FIG. 1 is a schematic diagram illustrating an example of a configuration of a printing system 1 according to the present embodiment. The printing system 1 of FIG. 1 includes a client terminal 10 and an image forming apparatus 12 connected to each other through a network 14 to perform data communication with each other. The network 14 is a wired network or a wireless network. The client terminal 10 is an example of a terminal apparatus.

The client terminal 10 transmits print data to the image forming apparatus 12 and causes the image forming apparatus 12 to perform visible printing and invisible printing. Examples of the client terminal 10 include, but are not limited to, an output device such as a projector (PJ), an interactive white board (IWB), which is a whiteboard having an electronic whiteboard function capable of mutual communication, a digital signage, a head up display (HUD) device, and an industrial machine, an imaging device, an audio collecting device, a medical device, a networked home appliance, an automobile (connected car), a personal computer (PC), a mobile phone, a smartphone, a tablet terminal, a game console, a personal digital assistant (PDA), a digital camera, and a wearable terminal.

The client terminal 10 receives a print operation specifying data to be printed from a user. In the following description, the data to be printed may be referred to "print target data". The client terminal 10 generates print data from the print target data according to an operation for executing printing from the user, transmits the print data to the image forming apparatus 12, and causes the image forming apparatus 12 to perform visible printing and invisible printing. The client terminal 10 converts the print target image to a two-dimensional code and adds a printing command that instructs the image forming apparatus 12 to perform invisible printing of an image of the two-dimensional code to the print data, to cause the image forming apparatus 12 to perform visible printing of the print target image and invisible printing of the image of the two-dimensional code.

The image forming apparatus 12 is an electronic apparatus such as a printer or a multifunction peripheral/product/printer (MFP) capable of performing visible printing and invisible printing of print data. The image forming apparatus 12 performs invisible printing of the two-dimensional code using infrared ink or toner. The infrared ink or toner is colorless and transparent, and invisible in a natural light environment. The infrared ink or toner is readable with an infrared reader. A technology of printing (Infrared (IR) printing) using infrared ink or toner readable with an infrared reader is a known technology as described in, for example, Japanese Unexamined Patent Application Publication No. 2019-117352. The image forming apparatus 12 may perform invisible printing of the two-dimensional code using ultraviolet ink or toner. The ultraviolet ink or toner is colorless and transparent, and invisible in a natural light environment. The ultraviolet ink or toner is readable with an ultraviolet reader.

For example, the infrared reader irradiates an image printed using infrared ink or toner with infrared light to read the printed image. Further, the ultraviolet reader irradiates an image printed using ultraviolet ink or toner with ultraviolet light to read the printed image. For example, the reader can read a two-dimensional code printed by the image forming apparatus 12 using infrared ink or toner or ultraviolet ink or toner from a sheet. For example, a camera of a smartphone, a tablet terminal, or the like may be used as the infrared reader or the ultraviolet reader.

The configuration of the printing system 1 illustrated in FIG. 1 is merely one example. In another example, the client terminal 10 and the image forming apparatus 12 may transmit and receive print data via a print server or a cloud service.

Hardware Configuration

Hardware Configuration of Computer

Figure 2:
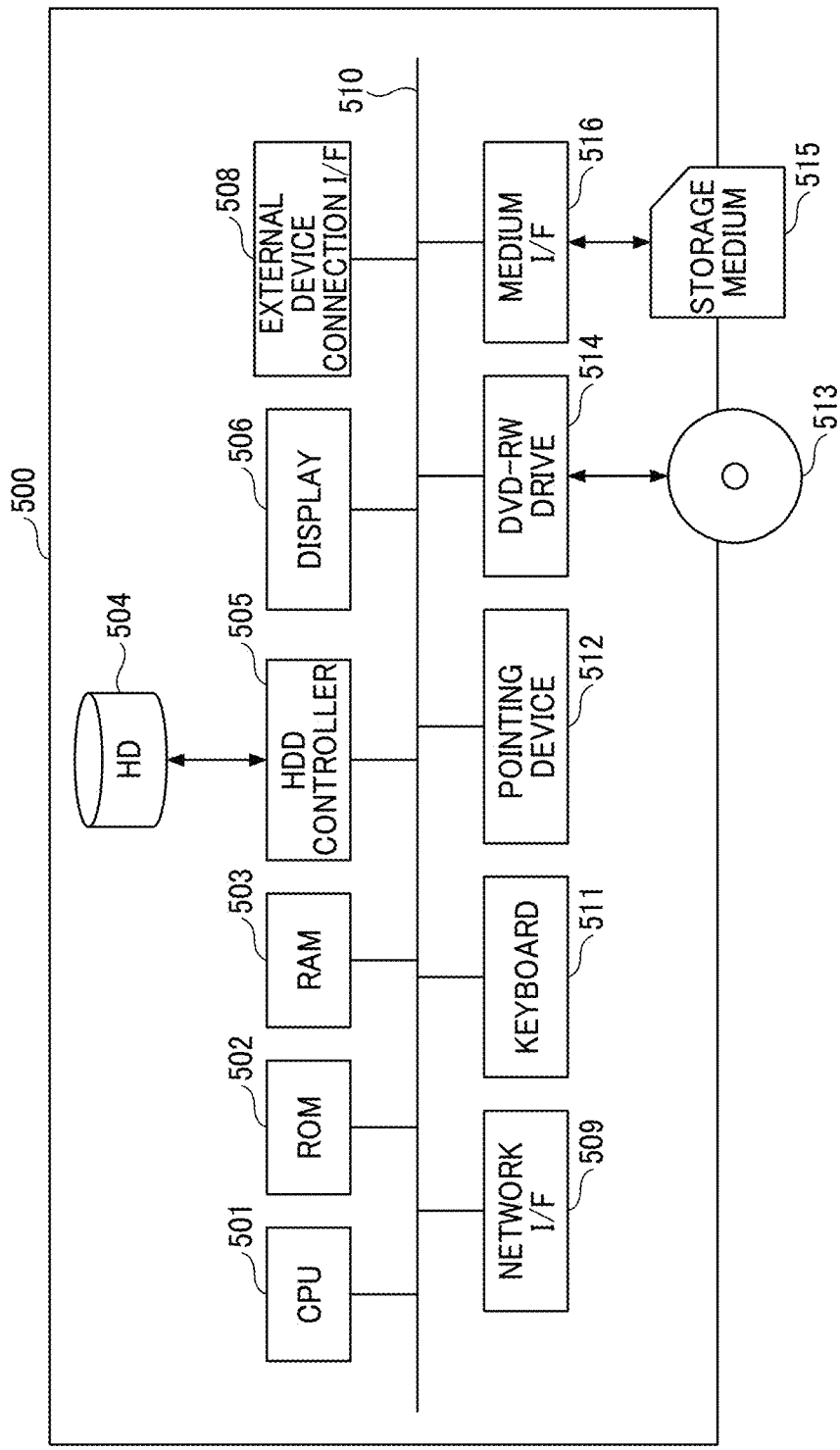
FIG. 2 is a block diagram illustrating an example of a hardware configuration of a computer, according to an embodiment of the present disclosure.

The client terminal 10 illustrated in FIG. 1 is implemented by, for example, a computer 500 having a hardware configuration as illustrated in FIG. 2. FIG. 2 is a block diagram illustrating an example of a hardware configuration of the computer 500, according to the present embodiment.

The computer 500 includes a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a data bus 510, a keyboard 511, a pointing device 512, a digital versatile disk rewritable (DVD-RW) drive 514, and a medium I/F 516.

The CPU 501 controls overall operation of the computer 500 according to a program. The ROM 502 stores a program such as an initial program loader (IPL) to boot the CPU 501. The RAM 503 is used as a work area for the CPU 501. The HD 504 stores various data such as the program. The HDD controller 505 controls reading or writing of various data with respect to the HD 504 under control of the CPU 501.

The display 506 displays various information such as a cursor, a menu, a window, a character, or an image. The external device connection I/F 508 is an interface that connects the computer 500 to various external devices. Examples of the external device in this case include, but are not limited to, a universal serial bus (USB) memory, the reader, and an image forming apparatus 12. The network I/F 509 is an interface for performing data communication using the network 14. Examples of the data bus 510 include, but are not limited to, an address bus and a data bus that electrically connect the components, such as the CPU 501, with one another.

The keyboard 511 is an example of an input device provided with a plurality of keys that allows a user to input characters, numerals, or various instructions. The pointing device 512 is an example of an input device that allows a user to select or execute a specific instruction, select an item to be processed, or move a cursor being displayed. The DVD-RW drive 514 controls reading and writing of various data from and to a DVD-RW 513, which is an example of a removable storage medium. The DVD-RW is merely one example of the removable storage medium. In another example, a digital versatile disk recordable (DVD-R) may be used as the removable storage medium. The medium I/F 516 controls reading and writing (storing) of data from and to a storage medium 515 such as a flash memory.

MFP

Figure 3:
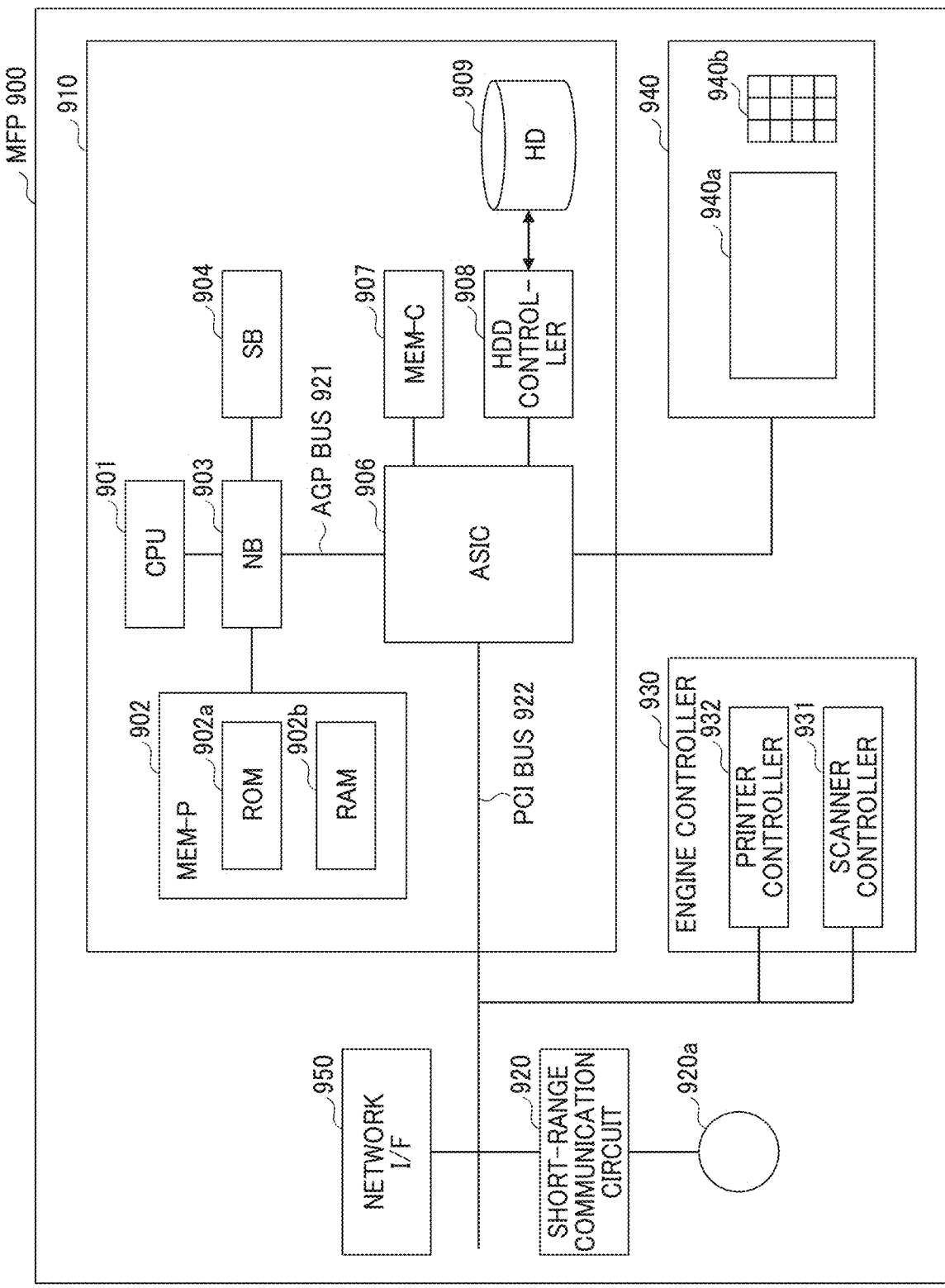
FIG. 3 is a block diagram illustrating an example of a hardware configuration of a multifunction peripheral/product/printer (MFP), according to an embodiment of the present disclosure.

The image forming apparatus 12 illustrated in FIG. 1 is implemented by, for example, an MFP 900 having a hardware configuration illustrated in FIG. 3. FIG. 3 is a block diagram illustrating an example of a hardware configuration of the MFP 900, according to the present embodiment.

The MFP 900 illustrated in FIG. 3 includes a controller 910, a short-range communication circuit 920, an engine controller 930, a control panel 940, and a network I/F 950. The controller 910 includes a CPU 901 as a main processor of a computer, a system memory (MEM-P) 902, a north bridge (NB) 903, a south bridge (SB) 904, an application specific integrated circuit (ASIC) 906, a local memory (MEM-C) 907 as a storage area, a hard disk drive (HDD) controller 908, and a hard disk (HD) 909 as a storage area. The NB 903 and the ASIC 906 are connected via an accelerated graphics port (AGP) bus 921.

The CPU 901 is a controller that controls overall operation of the MFP 900. The NB 903 is a bridge that connects the CPU 901 to the MEM-P 902, the SB 904, and the AGP bus 921. The NB 903 includes a memory controller that controls reading and writing from and to the MEM-P 902, a peripheral component interconnect (PCI) master, and an AGP target.

The MEM-P 902 includes a ROM 902a and a RAM 902b. The ROM 902a stores data and program for implementing various functions of the controller 910. The RAM 902b is used to load the program and the data. The RAM 902b is also used as memory for loading drawing data in printing. The program stored in the RAM 902b may be stored in any computer-readable storage (recording) medium, such as a compact disc-read only memory (CD-ROM), compact disc-recordable (CD-R), or digital versatile disc (DVD), in a file format installable or executable by the computer, for distribution.

The SB 904 is a bridge that connects the NB 903 with a PCI device or a peripheral device. The ASIC 906 is an integrated circuit (IC) dedicated to an image processing use and includes a hardware element for image processing. The ASIC 906 is a bridge that connects the AGP bus 921, a PCI bus 922, the HDD controller 908, and the MEM-C 907 with each other.

The ASIC 906 includes a PCI target, an AGP master, an arbiter (ARB) as a central processor of the ASIC 906, a memory controller to control the MEM-C 907, a plurality of direct memory access controllers (DMACs), and a PCI unit. The DMACs is capable of converting coordinates of image data with a hardware logic. The PCI unit transfers data between a scanner controller 931 and a printer controller 932 through the PCI bus 922. The ASIC 906 may be connected to a USB interface, or the Institute of Electrical and Electronics Engineers 1394 (IEEE1394) interface.

The MEM-C 907 is a local memory used as a buffer for image data to be copied or a code buffer. The HD 909 is a storage (memory) that stores various image data, font data for printing, and form data. The HDD controller 908 reads or writes various data from or to the HD 909 under control of the CPU 901. The AGP bus 921 is a bus interface for a graphics accelerator card, which is proposed to accelerate graphics processing. Through directly accessing the MEM-P 902 by high-throughput, speed of the graphics accelerator card is increased.

The short-range communication circuit 920 includes a short-range communication antenna 920a. The short-range communication circuit 920 is a communication circuit that communicates in compliance with the near field communication (NFC) or the Bluetooth®, for example.

The engine controller 930 includes the scanner controller 931 and the printer controller 932. The control panel 940 includes a panel display 940a and an operation panel 940b. The panel display 940a is, e.g., a touch panel that displays current settings or a selection screen and that receives a user input. The operation panel 940b includes, for example, a numeric keypad and a start key. The numeric keypad receives set values of various image forming parameters such as an image density parameter. The start key receives an instruction to start copying.

The controller 910 controls overall operation of the MFP 900. For example, the controller 910 controls drawing, communication, or user inputs to the control panel 940. The scanner controller 931 or the printer controller 932 includes an image processing unit for performing various image processing, such as error diffusion or gamma conversion.

In response to an instruction to select a specific application through the control panel 940, for example, using a mode switch key, the MFP 900 selectively performs a document box function, a copier function, a printer function, and a facsimile function. In response to selection of the document box function, the MFP 900 operates in a document box mode to stored document data. In response to selection of the copier function, the MFP 900 operates in a copier mode. In response to selection of the printer function, the MFP 900 operates in a printer mode. In response to selection of the facsimile function, the MFP 900 operates in a facsimile mode.

The network I/F 950 is an interface for performing data communication using the network 14. The short-range communication circuit 920 and the network I/F 950 are electrically connected to the ASIC 906 via the PCI bus 922.

Figure 4:
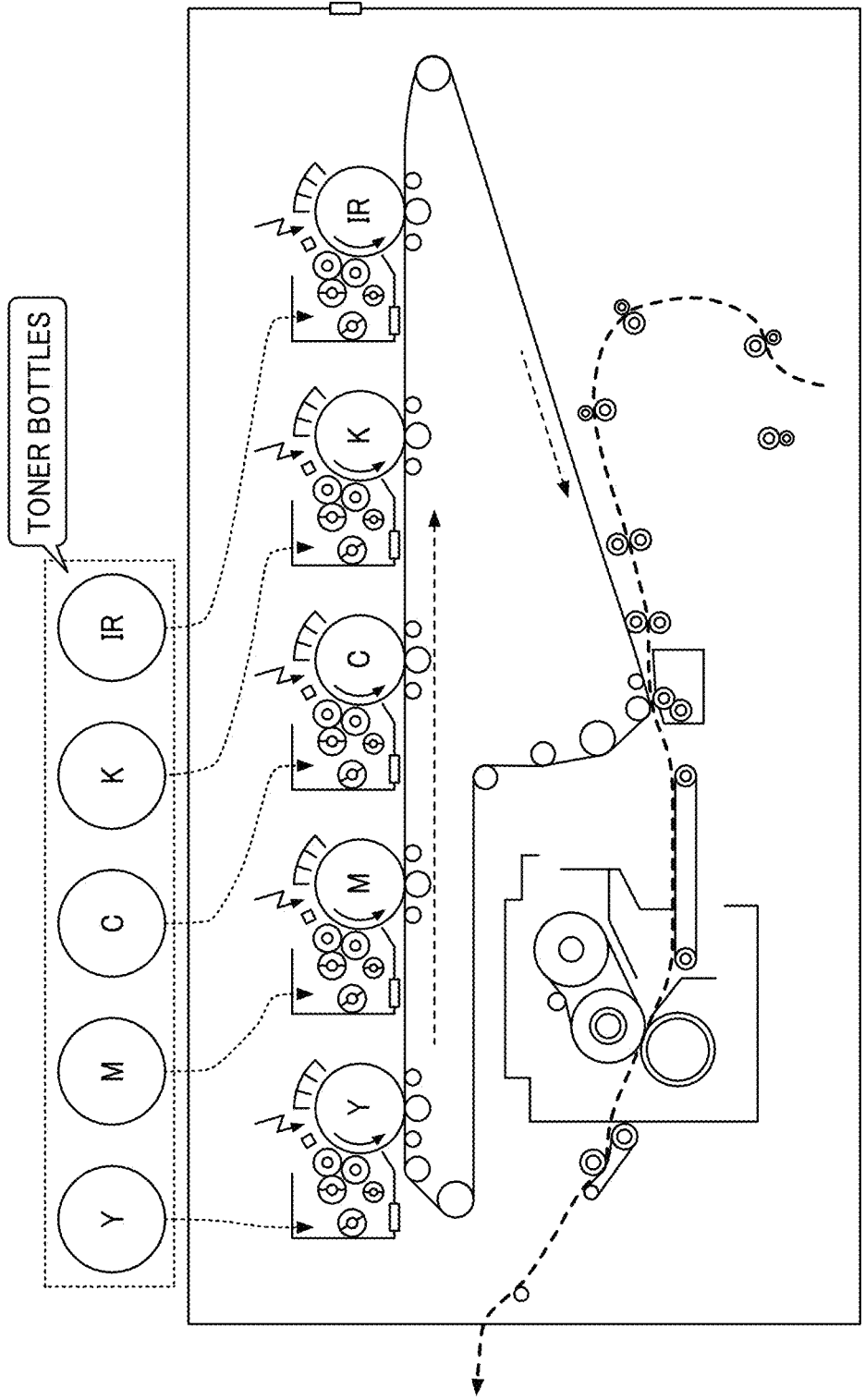
FIG. 4 is a diagram for describing an example of an engine configuration of the MFP, according to an embodiment of the present disclosure.
Figure 5:
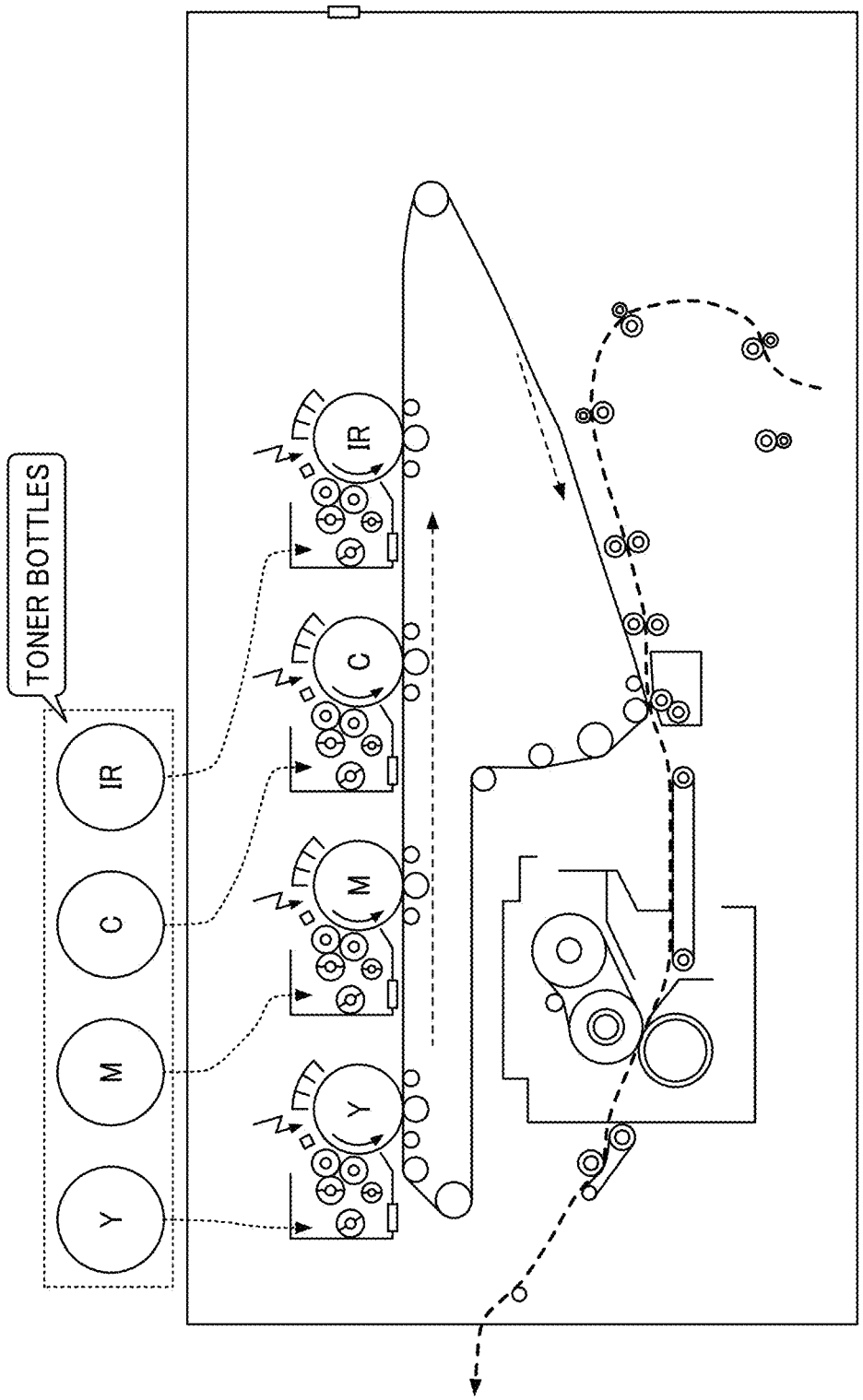
FIG. 5 is a diagram for describing an example of an engine configuration of the MFP, according to an embodiment of the present disclosure.

In the embodiment, an example of an engine configuration of the MFP 900 when infrared ink or toner (hereinafter, may be referred to as an "IR toner") is described. FIG. 4 and FIG. 5 are diagrams for describing an example of an engine configuration of the MFP 900.

For example, FIG. 4 illustrates an example in which the invisible IR toner is used as a spot color in addition to visible toners of four colors (C: cyan, M: magenta, Y: yellow, and K: black). In the engine configuration example of FIG. 4, an image of the two-dimensional code is printed with the spot color, and an image other than the image of the two-dimensional code is printed with the visible toners of four colors.

In the case of color printing that is not IR printing, a print image is printed with the visible toners of four colors. In the case of monochrome printing that is not IR printing, the print image is printed with the visible toner of K color. In the case of color printing that is IR printing, an image other than the image of the two-dimensional code is printed with visible toners of four colors. In the case of monochrome printing that is IR printing, an image other than the image of the two-dimensional code is printed visible toner of K color.

FIG. 5 illustrates another example in which an IR toner is used as a K toner in addition to visible toners of three colors (C: cyan, M: magenta, and Y: yellow). In the engine configuration example of FIG. 5, an image of the two-dimensional code is printed in K color with the IR toner, and an image other than the image of the two-dimensional code is printed with the visible toners of three colors. For example, by converting color information of an image other than the image of the two-dimensional code into C, M, and Y colors, K color other than the image of the two-dimensional code can be expressed by a mixture of the visible toners of three colors.

In the case of color printing that is not IR printing, color information of a print image is converted into C, M, and Y colors, and printing is performed with the visible toners of three colors, including K color of an image included in the print target data. In the case of color printing that is IR printing, the image of the two-dimensional code is printed in K color with the IR toner, and an image other than the image of the two-dimensional code is printed including K color with the visible toners of three colors.

In this manner, in the example of FIG. 4, the print data is generated with color information of the print image unchanged and with the image of the two-dimensional code as the spot color, the two-dimensional code being obtained by two-dimensionally encoding the print image. In the example illustrated in FIG. 5, the print data is generated with the image of the two-dimensional code as K color after converting the color information of the print image into C, M, and Y colors, the two-dimensional code being obtained by two-dimensionally encoding the print image.

Functional Configuration

Figure 6:
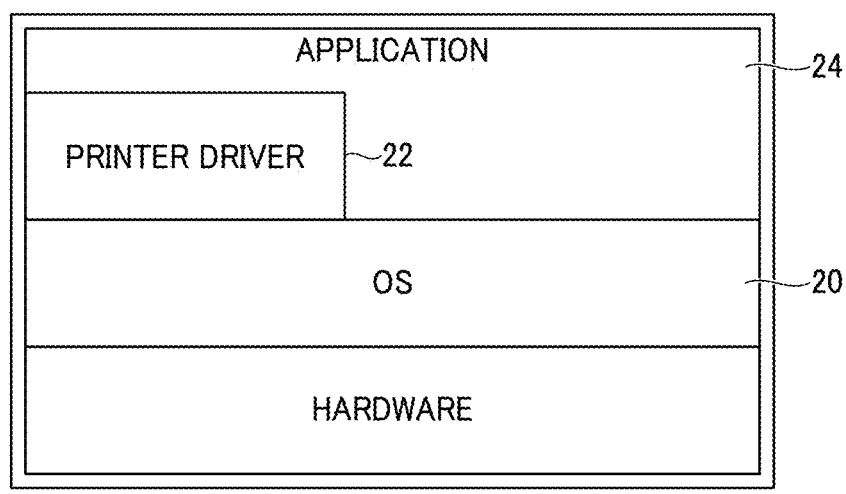
FIG. 6 is a diagram for describing programs installed in a client terminal, according to an embodiment of the present disclosure.

The client terminal 10 is installed with programs as illustrated in FIG. 6, for example. FIG. 6 is a diagram for describing the programs installed in the client terminal 10, according to the present embodiment. FIG. 6 illustrates an example in which an operating system (OS) 20, a printer driver 22, and an application 24 are installed as the programs in the client terminal 10.

The hardware of the client terminal 10 is controlled by the OS 20. The printer driver 22 and application 24 each operates via the OS 20. When printing is executed with the application 24 such as a word processing application or a spreadsheet application, the user configures print settings with the printer driver 22 via the OS 20. Application data generated by the application 24 is transmitted to the printer driver 22 via the OS 20.

The printer driver 22 converts the application data into data interpretable by the image forming apparatus 12 or adds a printing command for post-processing corresponding to the print settings, to generate print data. The print data generated by the printer driver 22 is transmitted from the OS 20 to the image forming apparatus 12 via the hardware of the client terminal 10 and the network 14.

Figure 7:
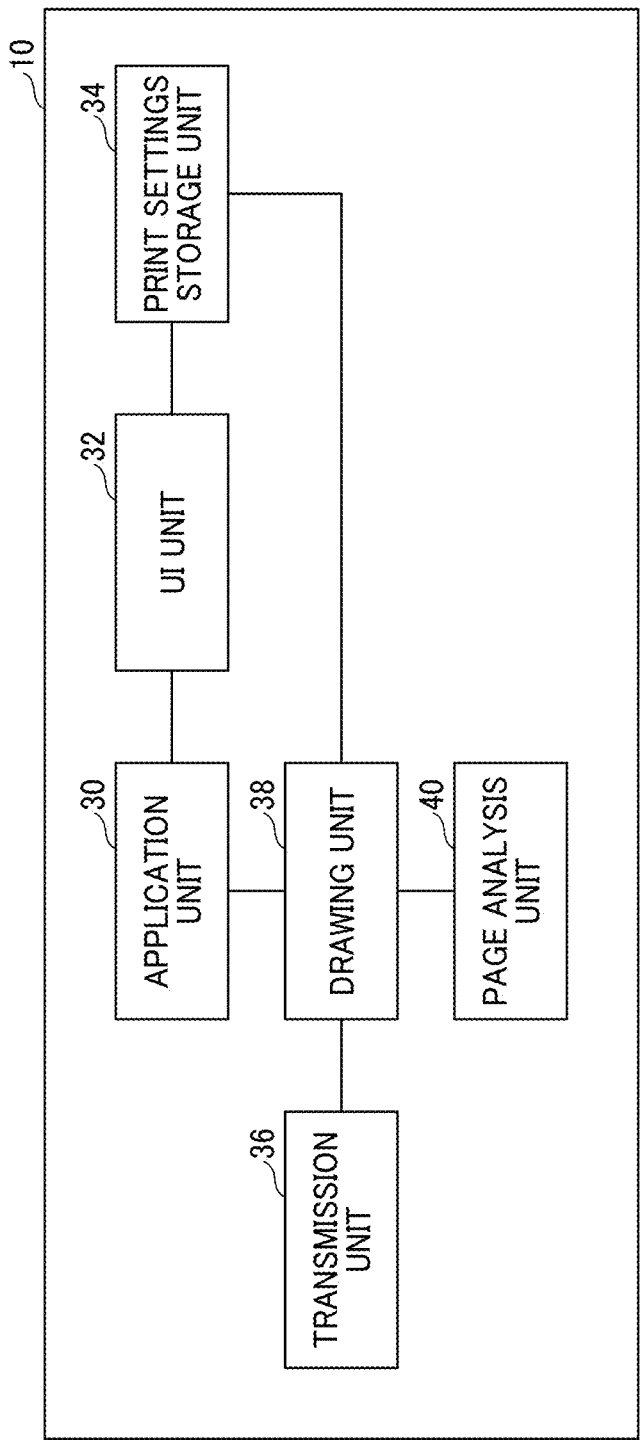
FIG. 7 is a block diagram illustrating an example of a functional configuration the client terminal, according to an embodiment of the present disclosure.

The client terminal 10 executes the program of FIG. 6 to implement, for example, a functional configuration as illustrated in FIG. 7. FIG. 7 is a block diagram illustrating an example of a functional configuration the client terminal 10, according to the present embodiment. The functional configuration of FIG. 7 omits components unnecessary for the description of the present embodiment as appropriate.

The client terminal 10 illustrated in FIG. 7 includes an application unit 30, a user interface (UI) unit 32, a print settings storage unit 34, a transmission unit 36, a drawing unit 38, and a page analysis unit 40. The transmission unit 36 is, for example, a spooler.

The application unit 30 is a function implemented by executing the application 24. The application unit 30 receives a user operation, to generate application data. When executing printing, the application unit 30 invokes the UI unit 32 to receive print settings from a user.

The UI unit 32 is a function implemented by executing the printer driver 22. The UI unit 32 displays a screen on the display 506, to provides a UI for receiving print settings from the user. The UI for receiving print settings is described below. The UI unit 32 controls the print settings storage unit 34 to store the print settings received from the user. The print settings storage unit 34 stores the print settings.

The application unit 30 transmits the generated application data to the drawing unit 38 as print target data. The print target data includes an image to be printed. In the following description, the image to be printed may be referred to as a "print target image". The drawing unit 38 is a function implemented by executing the printer driver 22. The drawing unit 38 receives the print target data from the application unit 30. Further, the drawing unit 38 reads print settings from the print settings storage unit 34.

The drawing unit 38 converts the print target data into print data in a format interpretable by the image forming apparatus 12 according to the print settings. The page analysis unit 40 is a function implemented by executing the printer driver 22. The page analysis unit 40 analyzes the received print target data, for example, page by page, and returns the analysis result to the drawing unit 38.

Further, when a setting "convert document into 2D code and print with IR toner" described below is configured in the print settings, the drawing unit 38 adds a printing command instructing printing an image of the two-dimensional code to be printed with the IR toner to a page of the print data. The image of the two-dimensional code to be printed with the IR toner according to the added printing command is obtained by two-dimensionally encoding the print target image. In the following description, the image of the two-dimensional code, which is obtained by two-dimensionally encoding the print target image may be referred to a "a two-dimensional code image".

In this manner, the drawing unit 38 adds the printing command instructing to print the two-dimensional code image with the IR toner to the print data converted from the print target image, and transmits the print data to which the printing command is added to the transmission unit 36.

By contrast, when the setting "convert document into 2D code and print with IR toner" described below is not configured in the print settings, the drawing unit 38 transmits print data converted from the print target image to the transmission unit 36. The transmission unit 36 spools the print data transmitted from the drawing unit 38 and successively transmits the spooled print data to the image forming apparatus 12.

Each of the functional units described above is implemented by hardware and software of the computer 500 that operate in cooperation. The software also includes hardware of one or more computers 500 and multiple pieces of software that operate in cooperation.

Operation

Figure 8:
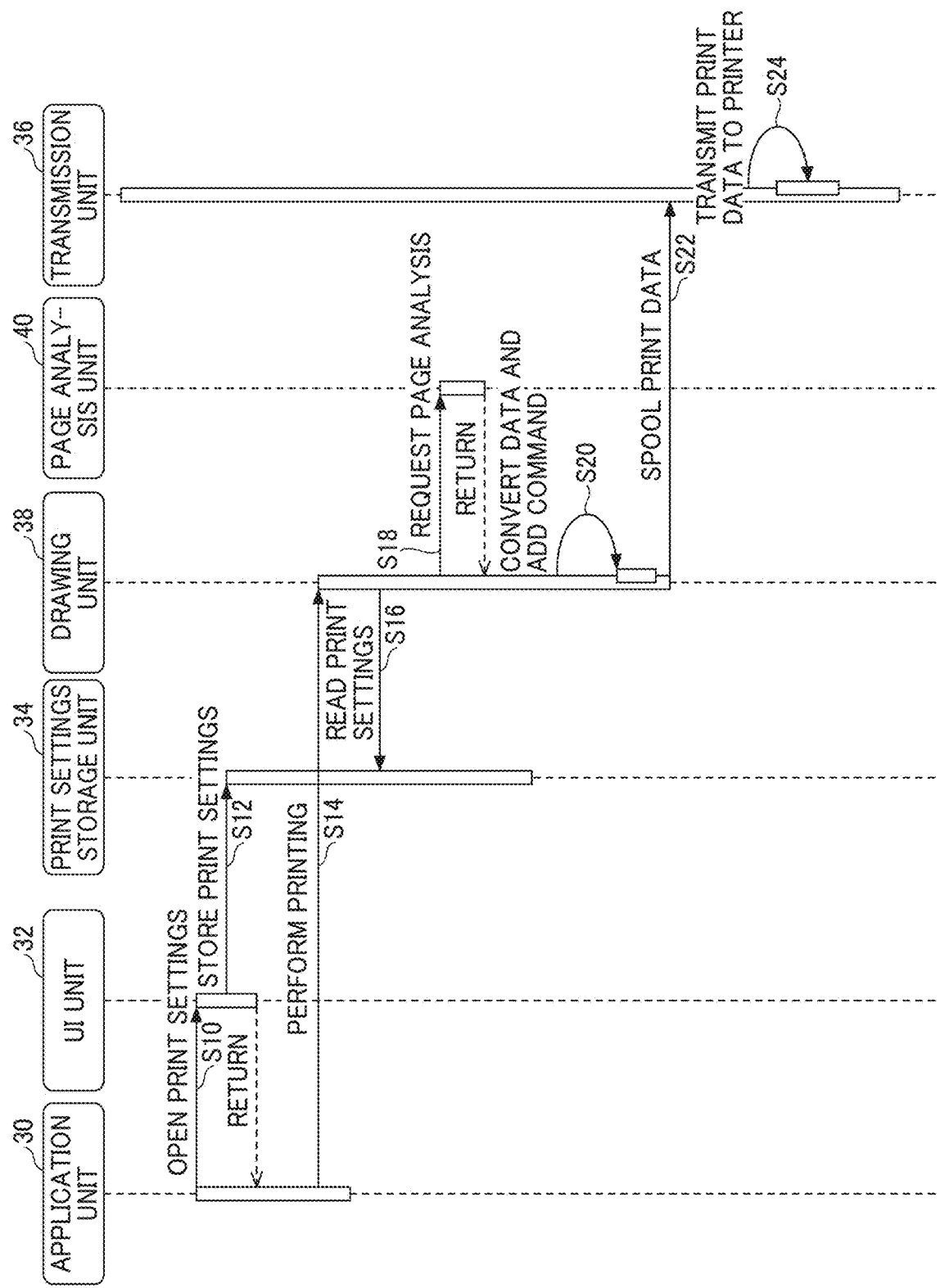
FIG. 8 is a sequence diagram illustrating an example of an overview of an operation performed by the client terminal, according to an embodiment of the present disclosure.

The client terminal 10 of the printing system 1 according to the present embodiment performs as operation as illustrated in FIG. 8, for example. FIG. 8 is a sequence diagram illustrating an example of an overview of an operation performed by the client terminal 10, according to the present embodiment.

Figure 9:
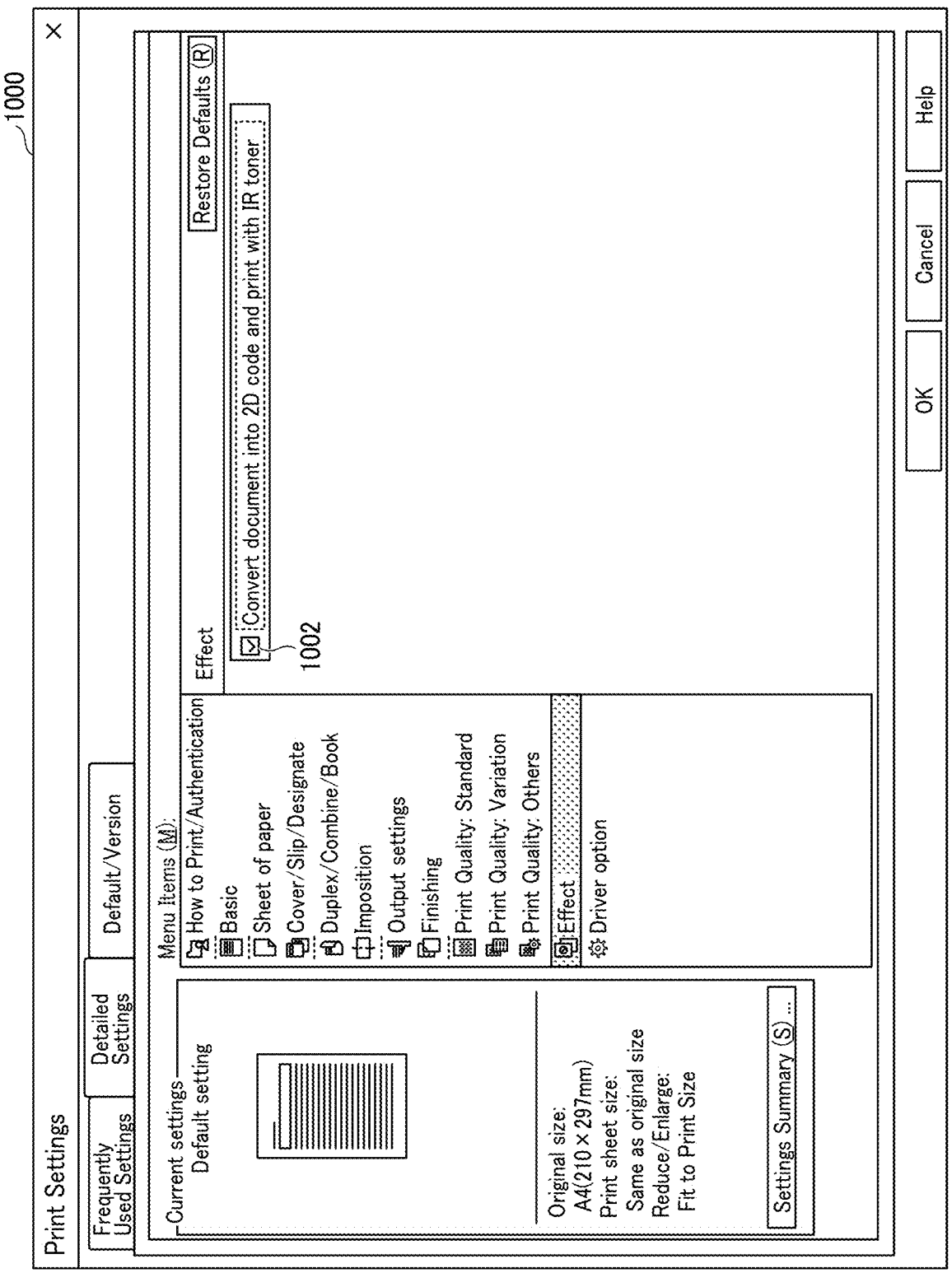
FIG. 9 is an illustration of an example of a print setting screen, according to an embodiment of the present disclosure.

In response to an instruction to execute printing according to an operation by a user, in step S10, the application unit 30 invokes the UI unit 32 to receive print settings from the user, and thus causes the UI unit 32 to display a print setting screen 1000 as illustrated in FIG. 9. FIG. 9 is an illustration of an example of the print setting screen 1000, according to the present embodiment.

The user can use a function of printing the two-dimensional code image with the IR toner by putting a mark in a check box 1002 for an item of "Convert document into 2D code and print with IR toner". In the following description, the function of printing the two-dimensional code with the IR toner may be referred to as a "two-dimensional code invisible printing function".

In response to receiving the print settings according to the operation by the user, the UI unit 32 causes the print settings storage unit 34 to store the print settings received from the user in step S12. Further, the UI unit 32 notifies the application unit 30 that the print settings have been received from the user.

In step S14, the application unit 30 transmits generated application data to the drawing unit 38 as print target data. In step S16, the drawing unit 38 reads the print settings from the print settings storage unit 34. In step S18, the drawing unit 38 transmits the print target data to the page analysis unit 40 as needed to request page analysis, and thus acquires a result of the analysis.

In step S20, the drawing unit 38 refers to the item "convert document into 2D code and print with IR toner" included in the print settings read out in step S16, to determine whether a setting for using the two-dimensional code invisible printing function is configured. When the setting of using the two-dimensional code invisible printing function is configured, the drawing unit 38 converts a print target image into print data in a format interpretable by the image forming apparatus 12 according to the print settings. Further, the drawing unit 38 adds, to the print data, a printing command instructing to print a two-dimensional code image with the IR toner. By contrast, when the setting of using the two-dimensional code invisible printing function is not configured, the drawing unit 38 converts a print target image into print data in a format interpretable by the image forming apparatus 12 according to the print settings.

In step S22, the drawing unit 38 transmits the print data to the transmission unit 36. In step S24, the transmission unit 36 spools the print data received from the drawing unit 38 and successively transmits the spooled print data to the image forming apparatus 12.

Figure 10:
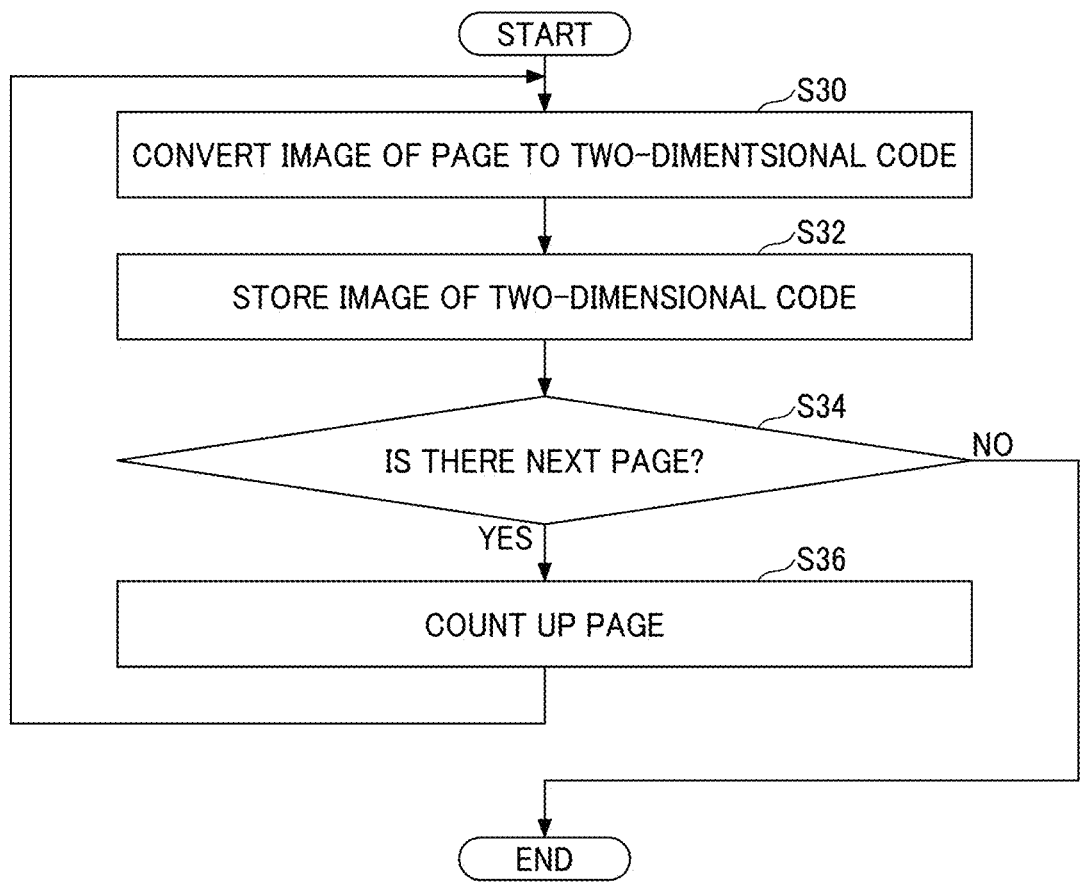
FIG. 10 is a flowchart of an example of an operation of converting a print target image to a two-dimensional code, according to an embodiment of the present disclosure.

The drawing unit 38 converts the print target image into a two-dimensional code, according to a procedure illustrated in FIG. 10, for example. FIG. 10 is a flowchart of an example of an operation of converting the print target image to a two-dimensional code.

In step S30, the drawing unit 38 converts the print target image into a two-dimensional code page by page, to generate a two-dimensional code image. For example, the drawing unit 38 compresses the print target image page by page and generates the two-dimensional code in which the compressed data is embedded. Therefore, the size of the two-dimensional code image generated by the drawing unit 38 may be changed according to an amount of the compressed data to be embedded.

In step S32, the drawing unit 38 stores the two-dimensional code image generated in step S30 for each page of the print target image. For example, the drawing unit 38 stores the two-dimensional code image in the RAM 503, the HD 504, or the like in association with the page of the print target image.

In step S34, the drawing unit 38 determines whether a next page of the print target image is present. In other words, the drawing unit 38 determines whether the print target image includes a page that is not yet converted to a two-dimensional code. When the print target image includes the next page, the operation proceeds to step S36. In step S36, the drawing unit 38 counts up a page to be converted to a two-dimensional code to the next page. Then, the operation returns to the process of step S30. By contrast, when the drawing unit 38 determines that the print target image includes no next page, the operation of the flowchart of FIG. 10 ends.

The drawing unit 38 adds a printing command instructing to print the two-dimensional code image generated and stored in the operation described above with reference to the flowchart of FIG. 10 with the IR toner to the print data converted from the print target image in a procedure illustrated in FIG. 11, for example.

FIG. 11 is a flowchart of an example of an operation of adding, to the print data, the printing command instructing to print the two-dimensional code image with the IR toner.

In step S40, the drawing unit 38 initializes coordinates at which the two-dimensional code is to be printed. In the following description, coordinates at which the two-dimensional code is to be printed may be referred to as "print coordinates". The print coordinates may be set in advance such as the upper left corner and the center. For example, the setting of the print coordinates may be specified on the system. Alternatively, the user may configure the setting of the print coordinates on the printer driver 22.

In step S42, the drawing unit 38 designates the print coordinates and adds the printing command instructing to print the two-dimensional code image generated and stored in the operation described above with reference to the flowchart of FIG. 10 with the IR toner to the print data for each page of the print target image.

In step S44, the drawing unit 38 determines whether a next page of the print target image is present. In other words, the drawing unit 38 determines whether the print target image includes a page to which the printing command instructing to print the two-dimensional code image with the IR toner is not yet added. When the print target image includes the next page, the operation proceeds to step S46. In step S46, the drawing unit 38 counts up a page to which the printing command instructing to print the two-dimensional code image with the IR toner is to be added to the next page. Then, the operation returns to the process of step S40. By contrast, when the drawing unit 38 determines that the print target image includes no next page, the operation of the flowchart of FIG. 11 ends.

With the operation described with reference to the flowchart of FIG. 11, the drawing unit 38 can add the printing command to the print data so that the two-dimensional code image is printed with the IR toner (invisible printing).

FIG. 12A, FIG. 12B, and FIG. 12C are illustrations for describing examples of a print result in which a two-dimensional code is printed as being visible. FIG. 13A and FIG. 13B are illustrations for describing examples of a print result in which a two-dimensional code is invisibly printed.

FIG. 12A is an illustration of an example of a print target image 1100. In the present embodiment, for example, the print target image 1100 of FIG. 12A is converted to a two-dimensional code. For example, the entirety of the print target image 1100 may be converted to a two-dimensional code. Alternatively, a part of the print target image 1100 may be converted to a two-dimensional code.

FIG. 12B illustrates an example of a print target image 1102a in which a two-dimensional code image 1104a is arranged and a print target image 1102b in which a two-dimensional code image 1104b is arranged. FIG. 12B illustrates an example in which each of the two-dimensional code image 1104a and the two-dimensional code image 1104b is printed on the same side of a sheet on which the print target image is printed. Since the two-dimensional code image is to be arranged so that the two-dimensional code image hides or does not overlap with the image to be printed, in FIG. 12B, the print target image 1100 in FIG. 12A is divided into the print target image 1102a and the print target image 1102b. In the print target image 1102a, the two-dimensional code image 1104a obtained by converting the print target image 1102a into a two-dimension code is arranged. In the print target image 1102b, the two-dimensional code image 1104b obtained by converting the print target image 1102b into a two-dimension code is arranged.

In the example illustrated in FIG. 12B, since the two-dimensional code image 1104a and the two-dimensional code image 1104b are added, the layouts of the print target image 1102a and the print target image 1102b are different from the layout of the print target image 1100 of FIG. 12A.

FIG. 12C illustrates an example of an image 1106 in which a two-dimensional code image 1108 is arranged. To print the two-dimensional code image 1108 with the layout of the print target image 1100 of FIG. 12A unchanged, for example, as illustrated in FIG. 12C, the two-dimensional code image 1108 has to be arranged and printed on the back side of a sheet on which the image 1106 to be printed is printed.

In the example illustrated in FIG. 12C, the two-dimensional code image 1108 has to be printed on the back side of a sheet on which the image 1106 to be printed is printed so as not to change the layout of the image 1106 to be printed.

To address such as issue, in the present embodiment, as illustrated in FIG. 13B, a two-dimensional code image 1112 that is invisible is arranged and printed on the same side of a sheet on which the print target image 1110 is printed with the layout of the print target image 1100 of FIG. 13A unchanged. FIG. 13B illustrates an example of a print result in which the two-dimensional code image 1112 is printed as invisible with the IR toner. FIG. 13B illustrates an example of a case in which the setting of using the two-dimensional code invisible printing function is configured. FIG. 13B illustrates an example of a print result in which the two-dimensional code image 1112 of the print target image 1100 of FIG. 13A is printed as invisible on the same side of a sheet on which the print target image 1100 is printed. In FIG. 13B, the two-dimensional code image 1112 is illustrated as if the image were visible to facilitate understanding. However, in fact, the two-dimensional code image 1112 is invisible in a natural light environment.

The printing system 1 according to the present embodiment can print the two-dimensional code image 1112 as invisible and overlaid or superimposed on the print target image 1100 of FIG. 13A. Thus, according to the printing system 1 according to the present embodiment, as illustrated in FIG. 13B, the two-dimensional code image 1112 is added and printed on the same side of a sheet on which the print target image 1110 is printed as visible with the layout of the print target image 1110 unchanged.

In the related art in which a particular character string (text) included in print data is converted into a two-dimensional code and the converted two-dimensional code is printed together with the print data, the converted two-dimensional code is added to original print data so that the converted two-dimensional code is printed at a position corresponding to insertion position information (e.g., any one of directly above, directly below, left, right, and diagonally lower right the particular character string). In the related art, the layout of an image printed on a print sheet according to original print data to which a two-dimensional code is added is different from the layout of an image printed on a print sheet according to the original print data to which the two-dimensional code is not added.

According to one or more embodiments of the present disclosure, an image of a two-dimensional code is added and printed, without changing a layout of an image visibly printed.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above. The printing system 1 described in the above embodiments is merely an example, and there may be various system configurations depending on applications or purposes.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The apparatuses or devices described in one or more embodiments are just one example of multiple computing environments that implement the one or more embodiments disclosed herein.

In some embodiments, the printing system 1 includes multiple computing devices, such as a server cluster. The multiple computing devices are configured to communicate with one another through any type of communication link, including the network 14, a shared memory, etc., and perform the processes disclosed herein.

Further, units such as the client terminal 10 and the image forming apparatus 12 can be configured to share the disclosed processes in various combinations. For example, a process executed by a particular unit may be executed by another unit or other units. In substantially the same manner, a function of a particular unit may be performed by another unit or other units. The components of the client terminal 10 and the image forming apparatus 12 may be combined into a single apparatus or may be divided into a plurality of apparatuses.

The invention claimed is:

1. A printing system comprising:
an image forming apparatus configured to perform visible printing and invisible printing; and
a terminal apparatus, the terminal apparatus including first circuitry configured to,
generate an image of a two-dimensional code by two-dimensionally encoding an entirety of a print target image or a part of the print target image, the generating the image of the two-dimensional code including,
compressing data corresponding to the entirety of the print target image or the part of the print target image, and
generating the two-dimensional code based on the compressed data;

add a printing command to print data generated based on the print target image, the printing command including instructions to the image forming apparatus to invisibly print the generated image of the two-dimensional code, and transmit, to the image forming apparatus, the print data to which the printing command is added; and the image forming apparatus includes second circuitry configured to, visibly print the print target image based on the transmitted print data, and invisibly print the image of the two-dimensional code according to the printing command, the invisibly printed image of the two-dimensional code printed on a same print sheet as a print sheet on which the print target image is visibly printed.

2. The printing system of claim 1, wherein the printing command includes further instructions to the image forming apparatus to invisibly print the image of the two-dimensional code such that the image of the two-dimensional code is superimposed on the print target image.

3. The printing system of claim 1, wherein the first circuitry of the terminal apparatus is further configured to:

provide a user interface (UI) configured to receive a selection from a user, the selection indicating whether to use a function of invisibly printing the image of the two-dimensional code;

add the printing command based on the received selection; and does not add the printing command in response to receiving no selection of using the function of invisibly printing the image of the two-dimensional code.

4. The printing system of claim 1, wherein the printing command further includes instructions to invisibly print the image of the two-dimensional code on a same side of a sheet on which the print target image is printed with a layout of the print target image unchanged, the print target image being visibly printed based on the print data.

5. The printing system of claim 1, wherein the first circuitry of the terminal apparatus is further configured to:

two-dimensionally encode the print target image.

6. The printing system of claim 1, wherein second circuitry is further configured to:

invisibly print the image of the two-dimensional code using invisible ink.

7. The printing system of claim 6, wherein the invisible ink is an infrared (IR) based ink.

8. The printing system of claim 6, wherein the invisible ink is an ultraviolet (UV) based ink.

9. The printing system of claim 1, wherein a data size of the two-dimensional code is based on a data size of the print target image.

10. The printing system of claim 1, wherein the first circuitry is further configured to:

add printing coordinates to the print data generated based on the print target image, the printing coordinates indicating coordinates at which the two-dimensional code is to be printed on the same print sheet.

11. The printing system of claim 1, wherein the first circuitry is further configured to:

determine whether the print target image is to be printed on a plurality of pages;

generate a second image of a second two-dimensional code by two-dimensionally encoding a second print target image of a next page to be printed of the plurality of pages;

add a second printing command based on the second print target image of a next page to be printed, the second printing command including instructions to the image forming apparatus to invisibly print the generated image of the second two-dimensional code; and transmit, to the image forming apparatus, second print data to which the second printing command is added.

12. The printing system of claim 11, wherein the second circuitry is further configured to:

visibly print the second print target image based on the transmitted second print data; and invisibly print the second image of the second two-dimensional code according to the second printing command, the invisibly printed image of the second two-dimensional code printed on a same second print sheet as a second print sheet on which the second print target image is visibly printed.

13. The printing system of claim 1, wherein the print target image is image data configured to be visibly printed by the image forming apparatus.

14. A terminal apparatus comprising circuitry configured to:

compressing data corresponding to an entirety of a print target image or a part of the print target image;

generate an image of a two-dimensional code by two-dimensionally encoding the entirety of the print target image or the part of the print target image, the two-dimensional code generated based on the compressed data;

add a printing command to print data generated based on the print target image, the printing command including instructions to the image forming apparatus to invisibly print the generated image of the two-dimensional code; and transmit, to an image forming apparatus configured to perform visible printing and invisible printing, the print data to which the printing command is added, the transmitted print data causing the image forming apparatus to, visibly print the print target image based on the transmitted print data, and invisibly print the image of the two-dimensional code according to the printing command, the invisibly printed image of the two-dimensional code printed on a same print sheet as a print sheet on which the print target image is visibly printed.

15. The terminal apparatus of claim 14, wherein the circuitry is further configured to:

determine whether the print target image is to be printed on a plurality of pages;

generate a second image of a second two-dimensional code by two-dimensionally encoding a second print target image of a next page to be printed of the plurality of pages;

add a second printing command based on the second print target image of a next page to be printed, the second printing command including instructions to the image forming apparatus to invisibly print the generated image of the second two-dimensional code; and transmit, to the image forming apparatus, second print data to which the second printing command is added.

16. The terminal apparatus of claim 15, wherein, in response to the transmitted second print data, the image forming apparatus is further caused to:

visibly print the second print target image based on the transmitted second print data; and invisibly print the second image of the second two-dimensional code according to the second printing command, the invisibly printed image of the second two-dimensional code printed on a same second print sheet as a second print sheet on which the second print target image is visibly printed.

17. The terminal apparatus of claim 14, wherein the print target image is image data configured to be visibly printed by the image forming apparatus.

18. A non-transitory computer-executable medium storing a program including computer readable instructions which, when executed by one or more processors of a terminal apparatus, causes the terminal apparatus to perform a method comprising:
- compressing data corresponding to an entirety of a print target image or a part of the print target image;
- generating an image of a two-dimensional code by two-dimensionally encoding the entirety of the print target image or the part of the print target image, the two-dimensional code generated based on the compressed data;
- adding a printing command to print data generated based on the print target image, the printing command including instructions to the image forming apparatus to invisibly print the generated image of the two-dimensional code; and
- transmitting, to an image forming apparatus configured to perform visible printing and invisible printing, the print data to which the printing command is added, the transmitted print data causing the image forming apparatus to, visibly print the print target image based on the transmitted print data, and invisibly print the image of the two-dimensional code according to the printing command, the invisibly printed image of the two-dimensional code printed on a same print sheet as a print sheet on which the print target image is visibly printed.

19. The non-transitory computer-executable medium of claim 18, wherein the terminal apparatus is further caused to:
- determine whether the print target image is to be printed on a plurality of pages;
- generate a second image of a second two-dimensional code by two-dimensionally encoding a second print target image of a next page to be printed of the plurality of pages;
- add a second printing command based on the second print target image of a next page to be printed, the second printing command including instructions to the image forming apparatus to invisibly print the generated image of the second two-dimensional code; and
- transmit, to the image forming apparatus, second print data to which the second printing command is added.

20. The non-transitory computer-executable medium of claim 19, wherein, in response to the transmitted second print data, the image forming apparatus is further caused to:
- visibly print the second print target image based on the transmitted second print data; and
- invisibly print the second image of the second two-dimensional code according to the second printing command, the invisibly printed image of the second two-dimensional code printed on a same second print sheet as a second print sheet on which the second print target image is visibly printed.

* * * * *